United States Patent [19]

Richard et al.

[11] Patent Number: 5,814,407
[45] Date of Patent: Sep. 29, 1998

[54] GLYCOSYLATED PARTICLE OF LATEX OR OF INORGANIC OXIDE AND PROCESS FOR THE PREPARATION THEREOF

[75] Inventors: Joel Richard, Chantilly; Sophie Vaslin, Bry-sur-Marne; Chantal Larpent, Versailles, all of France

[73] Assignee: Societe Prolabo, Fontenay-Sous-Bois, France

[21] Appl. No.: 550,371

[22] Filed: Oct. 30, 1995

[30] Foreign Application Priority Data

Oct. 28, 1994 [FR] France ................................ 94 12970

[51] Int. Cl.⁶ .............................. B01J 2/30; B01J 13/00; B05D 3/10; B32B 5/02
[52] U.S. Cl. ...................... 428/404; 252/315.2; 427/222; 428/402.24; 428/407; 436/527; 436/534; 525/54.2
[58] Field of Search ............................ 427/222; 428/407, 428/402.24, 404; 424/280.1; 436/534; 525/54.2; 252/315.2

[56] References Cited

U.S. PATENT DOCUMENTS

| 4,264,766 | 4/1981 | Fischer ................................ 525/54.2 X |
| 4,563,431 | 1/1986 | Pauly et al. ......................... 436/534 X |
| 4,613,665 | 9/1986 | Larm .................................. 525/54.2 X |
| 4,673,707 | 6/1987 | Tsai et al. ........................... 525/54.2 |
| 4,945,146 | 7/1990 | Kapmeyer et al. ................ 436/534 X |
| 5,063,109 | 11/1991 | Bieniarz et al. ................... 428/407 X |
| 5,194,300 | 3/1993 | Cheung ............................... 428/407 X |
| 5,364,647 | 11/1994 | Hill et al. ........................... 428/404 X |

FOREIGN PATENT DOCUMENTS

| 0 001 223 | 8/1978 | European Pat. Off. . |
| 0 227 054 | 12/1986 | European Pat. Off. . |
| 2 677 366 | 6/1991 | France . |
| 816510 | 1/1956 | United Kingdom . |

OTHER PUBLICATIONS

Chemical Abstracts, vol. 119, No. 20, Nov. 15, 1993. Abstract No. 204179a.

*Primary Examiner*—Richard D. Lovering
*Attorney, Agent, or Firm*—Jacobson, Price, Holman & Stern, PLLC

[57] ABSTRACT

The invention relates to a glycosylated particle of latex or of inorganic oxide, exhibiting functional radicals at the surface. At least a proportion of said functional radicals is joined to a glycosyl residue.

The particles preferably consist either of polymers obtained by polymerization of ethylenically unsaturated monomers or of silica.

The invention finds an application as a detection agent in biology.

11 Claims, No Drawings

GLYCOSYLATED PARTICLE OF LATEX OR OF INORGANIC OXIDE AND PROCESS FOR THE PREPARATION THEREOF

BACKGROUND OF THE INVENTION

The present invention relates to a new glycosylated particle of latex or of inorganic oxide, to a process for the preparation of such a particle and to the application of the glycosylated particle as an agent for diagnosis or for biological (immunological, enzyme and the like) assay and in molecular biology or in affinity chromatography.

It also relates to the optionally N-alkyl acrylamidoglycosyl compounds which are useful especially in the preparation of said glycosylated particles.

PRIOR ART

Latex particles or microspheres have long been employed as material for medical diagnosis and silica microspheres in chromatography. For example, latex particles are employed in agglutination tests and are used to detect the presence or the absence of antibody or of antigen. Actually, an antibody or an antigen is bound to the surface of a latex particle which can consequently react with the corresponding antigen(s) or antibody (antibodies) present in a body fluid, for example blood serum, the cephalorrhachidian liquid (CRL), urine or a tissue extract preparation. The detection methods are well known to a person skilled in the art. These polymer particles can be obtained in a conventional manner, for example by the emulsion polymerization of styrene or of other vinyl monomers.

It is nevertheless known that, when they are employed in medical diagnosis, for example in agglutination tests, these particles exhibit a hydrophobic character that is too pronounced to permit a coupling with antibodies or antigens without loss of activity or of sensitivity. The means for controlling more efficiently the equilibrium of the hydrophobic character and of the hydrophilic character at the interface between the polymer and water has therefore been sought.

In order to modify this equilibrium it has already been proposed to couple the surface of these particles with polar functional groups with or without a reactive group.

A particularly advantageous technique would consist in functionalizing these latex particles with carbohydrate residues because of the biocompatibility of these groups and of their advantage in biological recognition mechanisms involving glycoproteins or glycolipids.

With this in mind, M. T. Charreyre et al., Colloid & Polym. Sci. 271:668–679 (1993), have proposed to prepare polystyrene latices covered with disaccharide units by a co(polymerization) process from a seed in the presence of an oligosaccharide ending in a hexyl methacrylate group: 6-(2-methylpropenoyloxy)hexyl β-D-cellobioside (CHMA). However, this compound exhibits the disadvantage of not being chemically stable at acidic pH (lower than 4) and of then being degraded by a hydrolysis reaction of the saccharide group, resulting in the formation of a free glycoside compound in the latex serum, which promotes bacterial proliferation.

Furthermore, M. C. Davies et al., (Langmuir 1993, 9, 1637–1645) have also proposed to copolymerize, in the presence of styrene, an acrylamidothiogalactose which is 1-[[2-[[(N-acrylamidomethyl)amino]carbonyl]ethyl]thiol]-β-D-galactopyranoside, the synthesis of which is particularly tricky (stage of blocking of the —OH functional groups of the modified galactose) and the stability of which at pH higher than 9 is uncertain.

SUMMARY OF THE INVENTION

One of the objectives of the present invention is to propose new glycosylated particles of polymer or of inorganic oxide which have very little sensitivity to hydrolysis.

Another objective of the present invention is to propose latex or silica particles which exhibit interfacial properties, more particularly in their interaction with proteins, which are improved and/or modified in relation to those already obtained in the art, especially according to the two above-mentioned publications.

It is also an objective of the present invention to propose a new process for the preparation of particles of latex or of inorganic oxide, especially of silica, which are functionalized with glycosyl residues.

The invention relates firstly to a glycosylated particle of latex or of inorganic oxide, in which at least one chain, to the end of which a glycosyl residue is attached, is bound to the surface of said particle.

The term "bound" means that this particle can be obtained either by grafting onto a microsphere or by overpolymerization starting from a seed. The particle according to the invention is preferably obtained by grafting.

The chain/glycosyl residue unit is also called a "glycosylated chain".

Latex microspheres traditionally consist of polymers obtained by polymerization of ethylenically unsaturated monomers and the particles of inorganic oxide, especially of silica, are obtained in a known manner. These particles are functionalized at the surface with amine, thiol or phenol functional groups or with functional groups which are precursors of amines, thiols or phenols and of silanols in the case of silica particles, which will be subsequently converted.

In the case of latex microspheres, these are homopolymers or copolymers containing units derived from vinylaromatic or ethylenic monomers, optionally from alkanoic or ethylenic acids or esters, a proportion of these monomers being functionalized with chlorine-containing radicals. The chlorine-containing radicals permit a subsequent conversion to an amine functional group or with amine radicals or to a thiol functional group.

They may also be homopolymers or copolymers containing units derived from vinylaromatic monomers which are hydroxylated (phenol functional group) or modified with thiol radicals (thiophenol functional group).

This type of polymer is easily accessible to any person skilled in the art and it will be sufficient to mention hereinafter a few monomers from which they originate, no limitation being implied. These may be:

- ethylenic monomers of isoprene, 1,3-butadiene, vinylidene chloride or acrylonitrile type,
- vinylaromatic monomers like styrene, hydroxystyrene, bromostyrene, alpha-methylstyrene, ethylstyrene, vinyltoluene, chlorostyrene or chloromethylstyrene or vinylnaphthalene, 4-hydroxystyrene, or 4-mercaptostyrene,
- alkenoic acids, esters or anhydrides like acrylic, methacrylic acids, alkyl acrylates and methacrylates in which the alkyl group has 1 to 10 carbon atoms, hydroxyalkyl acrylates, acrylamides, esters of ethylenic acids containing 4 or 5 carbon atoms, as well as
- difunctional monomers such as divinylbenzene or 2,2-dimethyl-1,3-propylene diacrylate and/or other water-insoluble copolymerizable monomers.

In the case where the latex particle comprises amine, phenol or thiol radicals at the surface, only a proportion of the monomers carries amine radicals or radicals capable of being converted to amine radicals, like chloromethyl groups or thiol or phenol radicals in a proportion of 1 to 25% by weight relative to the totality of the monomers employed.

The monomers are used as a mixture or sequentially in multistage processes.

The polymer particles may be obtained by the use of any polymerization technique, like conventional emulsion, microemulsion, suspension or microsuspension polymerization, or, where appropriate, by polymerization in organic medium. These techniques, which are familiar to a person skilled in the art will not be recalled here.

The silica particles are functionalized in a known manner.

The particles according to the invention are hydrophobic or hydrophilic such as silica and are preferably of a size which is generally between 0.01 and 20 microns and preferably smaller than 5 microns. They are calibrated, monodisperse and present in the latex in a proportion of a quantity varying between 0.05 to 30% by weight of the total weight of the latex, preferably between 0.1 and 10%.

The surface density of functional groups per square meter of microsphere is generally between approximately 1 and approximately 50 microequivalents, preferably in the region of 30 microequivalents.

The latex particles may be magnetizable and, in this case, they are used in combination with magnetizable materials as described, for example, in Patents U.S. Pat. No. 4 339 337, U.S. Pat. No. 4 358 388 and U.S. Pat. No. 4 948 739.

Among the materials of which the magnetizable parts of the microspheres may consist there may be mentioned magnetite, hematite, chromium dioxide, mixed yttrium iron oxides, ferrites such as manganese, nickel and manganese-zinc ferrites, and cobalt, nickel, gadolinium and samarium-cobalt alloys. The preferred materials are generally magnetite and hematite.

The quantity of magnetizable materials present in the microspheres corresponds to approximately 0.5 to 70%, preferably to approximately 15 to 60% of the weight of the magnetizable composite microsphere.

Because of the presence of the chain which may function as a "spacer arm", steric hindrances and the possibilities of denaturation of the proteins due to the proximity of the solid phase represented by the microsphere are eliminated.

The chain preferably has a mean length ranging from 5 to 120 angstroms, advantageously from 5 to 50 angstroms and more advantageously in the region of 10 angstroms.

The chain preferably contains from 4 to 80 carbon atoms, advantageously 3 to 20 atoms.

It is generally an optionally substituted divalent hydrocarbon radical optionally containing in the main chain one or more heteroatoms chosen from nitrogen, oxygen, sulfur or phosphorus atoms, it being possible for one or more of the carbon atoms to belong to carbonyl groups or derivatives (imine, oxime and the like), or containing one or more rings or heterocyclic rings.

The substituents of the divalent radical are those that do not produce any steric hindrance such that the grafting onto the functional radicals of the microsphere would become difficult or even impossible. They are therefore substituents of little hindrance, such as methyl, amino or OH radicals and the like.

Similarly, these substituents or heteroatoms forming part of the chain itself must not interfere in the reaction between the glycoside residue of this chain and the functional radicals.

In general, the number of glycosyl chains on each microsphere of latex or of inorganic oxide must be sufficient to permit the application of a diagnostic test.

DESCRIPTION OF THE PREFERRED EMBODIMENT

The particle according to the invention is preferably such that it comprises at the surface amine, thiol or phenol functional radicals or silanol functional radicals in the case of silica particles, at least a proportion of which forms part of the structure of said chain, the latter corresponding to the formula:

$$\text{)}-D-B-CH-CH-C-A\text{-glyc} \atop {\phantom{)-D-B-}|\phantom{H-}|\phantom{H-}\|\phantom{} \atop \phantom{)-D-B-}R_4\phantom{H}R_3\phantom{}O} \qquad \text{I}$$

A is the remaining part of said chain,

B is chosen from the group consisting of N—$R_1$ radicals or an oxygen atom or a sulfur atom, D is a divalent —$(CH_2)_n$— or phenylene radical, especially 1,3-phenylene or 1,4-phenylene, $R_1$ is a $C_1$-$C_4$ alkyl radical or a hydrogen atom, $R_3$ and $R_4$, which are identical or different, denote a $C_1$-$C_6$ lower alkyl radical or a hydrogen atom, n is an integer from 0 to 10, glyc is a glycosyl residue symbolizes the surface of the sphere.

Preferably, when the particle is a silica particle,

D is $(CH_2)_n$ with n=0,

B is 0.

When the particle is a latex particle containing amine radicals,

D is $(CH_2)_n$ with n=1 to 10,

B is N—$R_1$.

When the particle is a latex particle containing phenol or thiol radicals, D is the phenylene radical and B is O or S.

The particle according to the invention is preferably such that it comprises at the surface amine functional radicals at least a proportion of which forms part of the structure of said chain, the latter corresponding to the formula:

$$\text{)}-(CH_2)_n-N-CH-CH-C-A\text{-glyc} \atop {\phantom{)-(CH_2)_n-}|\phantom{H}|\phantom{H-}|\phantom{H-}\| \atop \phantom{)-(CH_2)_n-}R_1\phantom{H}R_4\phantom{H}R_3\phantom{}O} \qquad \text{II}$$

in which:

$R_1$, $R_3$, $R_4$ and A have the same meaning as in formula I, n is an integer from 1 to 10, glyc is the glycosyl residue.

A is preferably the radical

$R_2$ being a hydrogen atom or a $C_1$–$C_{14}$ alkyl or $C_7$–$C_{14}$ aralkyl radical, said radicals being optionally substituted by one or more terminal or pendent carboxylate or sulfonate radicals.

In practice, the number of glycosylated chains is a more or less high proportion of the quantity of amine, thiol, phenol and silanol functional radicals present on the microsphere.

This proportion advantageously varies between 10 and 99% of the amine, thiol, phenol and silanol functional radicals present at the surface of the microsphere; the proportion is preferably higher than 40% and more preferably higher than 80%.

According to an advantageous embodiment of the invention the glycosylated latex microsphere consists of polymers obtained by polymerization of ethylenically unsaturated monomers, exhibiting amine, thiol and phenol functional radicals at the surface, in which glycosyl residues are attached to a proportion of the functional radicals and in which said chain corresponds to the formula:

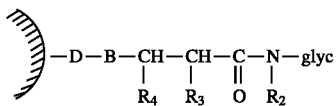
III in which:

D, B, $R_1$, $R_2$, $R_3$, $R_4$ and glyc have the same meaning as above.

The term "attached" means that a glycosyl residue is connected to the radical B through the intermediacy of a divalent segment (in this case

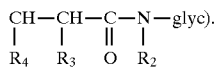

D—B is preferably

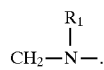

According to another preferred alternative form the invention relates to a particle of inorganic oxide which is modified at the surface with amine, thiol, phenol and silanol functional radicals, in which a proportion of the functional radicals is joined to a glycosyl reside and in which said chain corresponds to the formula:

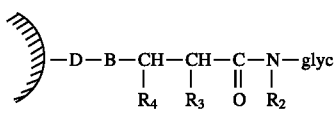
IV in which

D, B, $R_1$, $R_2$, $R_3$, $R_4$, n and glyc have the same meaning as above.

The silica particle is preferably modified with silanol radicals.

The inorganic particles according to the invention are preferably silica particles.

The amine functional radicals present at the surface of the inorganic particles are preferably —(CH$_2$)$_n$—NHR radicals with n between 1 and 10, R being a lower ($C_1$–$C_6$) alkyl radical.

The following sugar residues may be mentioned by way of indication among the glycosyl residues which are suitable in the context of the present invention:

glucose, galactose, galactopyranose, glycofuranose, fructose, fructopyranose, lactose.

The glycosyl residue is preferably the glucose residue.

According to an embodiment of the glycosylated latex microspheres where the glycosylated chain corresponds to formula III, an optionally N-alkyl acrylamidoglycosyl monomer and an ethylenically unsaturated monomer of acrylic type are overpolymerized on a polystyrene seed with the following conditions:

the expression acrylamido also includes the methacrylamido derivatives, the expression "monomer of acrylic type" is intended to mean alkenoic acids, esters or anhydrides like acrylic and methacrylic acids, alkyl acrylates and methacrylates in which the alkyl group has 3 to 10 carbon atoms, hydroxyalkyl acrylates, acrylamides and esters of ethylenic acids containing 4 or 5 carbon atoms, the diameter of the seed is submicronic, generally between 0.02 and 0.9 micrometers, and the particle mass fraction in the water ("solids content") is between 0.1 and 20%, the surface of the seed particles is functionalized with sulfate groups which originate essentially from the sulfate emulsifiers introduced into the synthesis (of the order of 1.4% relative to the monomers), the content of optionally N-alkyl acrylamidoglycosyl monomers which is introduced is between 1 and 25% by weight relative to the total weight of seed, preferably 5 to 15% by weight. The content of monomers of acrylic type is between 5 and 30%, advantageously 15 to 25%, the percentages being given in relation to the dry weight of seed.

The monomer of acrylic or methacrylic type is preferably an ester of acrylic or methacrylic acid.

The polymerization is performed in a known manner at an appropriate temperature of the order of 60° to 70° C. in the presence of potassium persulfate as initiator, for example.

It has been noted that the overpolymerization with a polystyrene seed in the presence of styrene (as a replacement for methyl methacrylate) did not permit the binding of the N-alkyl acrylamidoglycosyl monomer to the surface of the particles.

Another embodiment of the particles according to the invention, whether it be modified with the glycosylated divalent chain of formula I or another divalent chain of type II, consists in grafting an ω-glycosylated α-acrylic chain onto a latex or silica particle which is unmodified or functionalized at the surface with primary or secondary amine radicals, using a nucleophilic addition reaction of the Michael type.

In general, the primary or secondary amine functional radicals are connected to the latex or silica particle by a short ($C_1$–$C_5$) alkylene chain, preferably methylene in the case of the latex and butylene in the case of silica.

The degree of grafting is determined by UV spectrophotometry on the supernatant, by thin layer chromatography of the extracted polymer/monomer mixture or by the specific test with the "phenol-sulfuric acid" mixture, described by Lee in Anal. Biochem. 95, 260 (1979).

The reaction of the monomer with the amine radicals is performed at basic pH, between 8 and 12 and preferably in the region of 9.

In general, the quantity of amine functional radicals must be sufficient to make it possible to obtain grafting resulting in particles which are useful in the biological, diagnostic or affinity chromatography field.

Without any limitation being implied in the case of the latices, it may be indicated that the quantity of amine functional radicals is between 50 and 500 microequivalents per gram of polymer. This reaction is found to be particularly suitable in all cases, but advantageously so in the case where the glycosylated divalent chain corresponds to that of formula III.

The reaction is conducted at ambient temperature or at 60° C. with stirring in inert atmosphere, for example nitrogen. It may be followed by UW spectrophotometry on the aqueous phase and by thin layer chromatography (TLC) on the N-alkylacrylamidoglycosyl and the extracted polymer.

It has been found that the interfacial properties of the particles, and more particularly their interaction with proteins, depend on the degree and the method of introduction of the glycosyl residues at their surface (overpolymerization of the optionally N-alkyl acrylamidoglycosyl monomer in the presence of methyl methacrylate or equivalent or surface reaction on amine functional radicals). The conformation of the surface chains and the placing of the glycosyl residues are not identical in the case of the two functionalization processes and therefore produce microspheres of different three-dimensional structure.

Another subject of the invention is the optionally N-alkyl acrylamidoglycosyls of formula V:

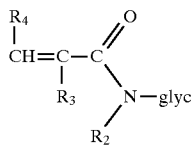

in which $R_3$ and $R_4$, which are identical or different, are a $C_1$–$C_6$ alkyl radical or a hydrogen atom, $R_2$ is an optionally substituted $C_1$–$C_{14}$ alkyl or $C_7$–$C_{14}$ aralkyl radical or a hydrogen atom, glyc is a sugar radical, useful especially in the preparation of the glycosylated particles.

The preparation of these compounds is performed in a simple manner, not requiring any stage of blocking of the hydroxyl functional groups.

The synthesis is carried out in two stages starting from the glycosylated compound by the action of the alkylamine and then acryloylation of the alkyl glycosylamine in aqueous medium, for example according to the following equation:

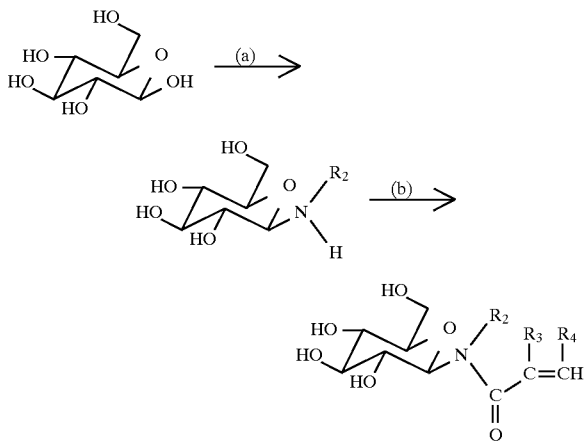

This method enables the monomer to be isolated in a yield higher than or equal to approximately 75%. The crude product thus obtained has a purity of approximately 90%. The impurities present are compounds which are diacryloylated in a variable position on the glycoside site, and this does not constitute a limiting factor for the use of the monomer in copolymerization or for the application of a surface reaction. The compound may be purified by chromatography on a column of silica gel.

The preparation of the surface-functionalized latex microspheres comprising amine, thiol or phenol functional radicals may be performed by employing the following process:

styrene-chloromethyl styrene copolymerization (VBC) in emulsion or in microemulsion, reaction of an alkylamine or aralkylamine in excess with the chloromethyl groups at the surface in a basic buffered medium (pH=8.5) and then removal of the excess amine by dialysis.

According to the following scheme:

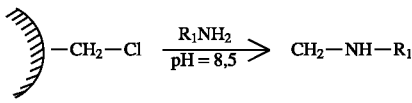

The yield of such a reaction is generally higher than 50%. The grafting of the optionally N-alkyl acryl-amidoglycosyl on these aminated microspheres is performed by adding this compound gradually to the microsphere suspension at a slightly basic buffered pH between 8 and 13. According to one variant the reactant is introduced in deficiency, the progress of the reaction being simply determined by the disappearance of the reactant in solution: determination by thin layer chromatography (TLC) and high-performance liquid chromatography, and the like. The reaction may be represented diagrammatically as follows:

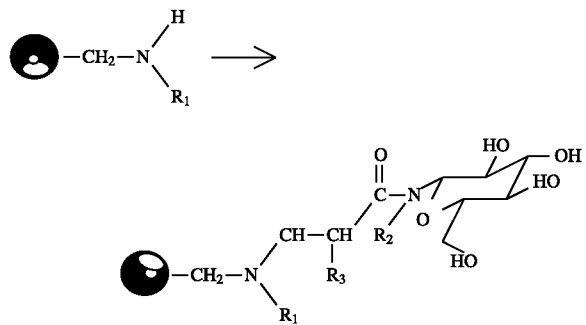

The preparation of the surface-functionalized silica particles comprising amine functional radicals may be performed by employing the following process:

reaction of an aminoalcohol or aminoaralcohol in excess with the surface silanol groups in a hydroalcoholic solvent medium.

The aminoalcohol is preferably a 4-amino-1-butanol.

The yield of such a reaction is generally higher than 50%. The grafting of the optionally N-alkyl acrylamidoglycosyl onto these aminated microspheres is performed by adding this compound gradually to the aqueous suspension of microspheres at a slightly basic buffered pH between 8 and 13. According to one variant the reactant is introduced in deficiency, the progress of the reaction being simply determined by the disappearance of the reactant in solution: determination by thin layer chromatography (TLC) and high-performance liquid chromatography and the like. The reaction may be represented diagrammatically as follows:

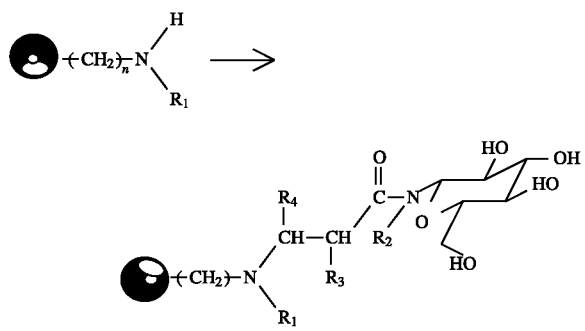

The preparation of the silica microspheres functionalized at the surface with silanol functional groups may be performed by grafting —OH functional groups onto the surface using a Michael addition in a known manner.

Finally, another subject of the invention is the use of the glucosylated particles described above as a diagnostic or detection agent or as a stationary phase in affinity chromatography.

These particles may be employed in very varied biological fields. Thus, in biomedical diagnostics and more particularly the tests of EIA or ELISA type, the glycosylated groups contribute a biocompatibility with the antibodies immobilized at the surface of the particles, in the case of which the Fc fragment contains carbohydrate residues.

The examples below illustrate the present invention.

EXAMPLE 1

Preparation of N-(β-D-plucopyranosyl)-N-octylacrylamide a) Synthesis of N-octyl-β-D-glucopyranosylamine 54 g of glucose (0.3 mol) are added to a solution of 40 g of octylamine (0.3 mol) in 50 ml of absolute methanol. The reaction mixture is heated to 65° C. for 20 min and then 50 ml of 95% hot ethanol are added. The N-octyl-β-D-glucopyranosylamine which precipitates on cooling (complete precipitation after 2 hours) is filtered off on a Buchner and then recrystallized from absolute ethand (1.5 1).

Mass obtained: 77.7 g Yield: 89%

Melting point (° C.)=103–107.

b) Synthesis of N-(β-D-glucopyranosyl)-N-octylacrylamide (AC8) in a water/THF mixture 33.6 g of sodium carbonate dissolved in the minimum quantity of water are added to 25 g of N-octyl-β-D-glucopyranosylamine in solution in 400 ml of water and 400 ml of THF. To the reaction mixture, cooled to 0° C., are added 36 ml of acryloyl chloride in 2 portions with an interval of 2 hours. The reaction mixture is next heated to 30° C. for 4 hours. After evaporation of the THF at reduced pressure the aqueous phase is extracted with 3×300 ml of ethyl acetate. The combined organic phases are next washed with 2×100 ml of an aqueous solution of sodium bicarbonate and then with water. After drying over magnesium sulfate and evaporation of the ethyl acetate 25.2 g of crude compound are isolated.

Yield: 85%

IR (nujol, γ cm$^{-1}$): 3500–3200 (H—O); 1650 (amide I); 1610 (C=C).

EXAMPLE 2

Synthesis of N-(β-D-glucopyranosyl)-N-octylacrylamide: "acrylamidosugar" AC8 a) Synthesis of N-octyl-β-D-alucopyranosylamine

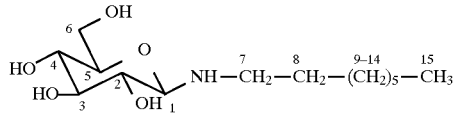

60 mmol (10.8 g) of glucose are added to a solution of 60 mmol (7.7 g) of octylamine in 10 ml of methanol. The reaction mixture is heated to 60°–65° C. for 15 min. The crude N-octyl-β-D-glucopyranosylamine precipitates after addition of 10 ml of 95% ethanol. It is filtered off and recrystallized 3 times from absolute ethanol.

Mass obtained: 12.8 g Yield: 75%

Melting point (° C.)=104–106.

b) Synthesis of N-(β-D-glucopyranosyl)-N-octyl-acrylamide: "acrylamidosugar" AC8 in methanol

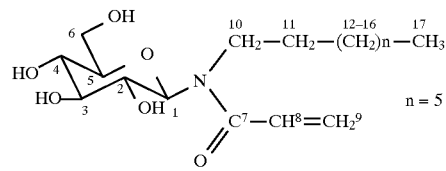

62.5 mmol (6.63 g) of sodium carbonate are added to 24 mmol (7 g) of N-octyl-β-D-glucopyranosylamine in 100 ml of methanol at 30° C.; 48 mmol (3.9 ml) of acryloyl chloride are run in at 0° C. over 5 minutes into the heterogeneous mixture. The reaction mixture is left at ambient temperature with stirring for 25 minutes. After addition of 100 ml of water and evaporation of the methanol the acrylamidosugar is extracted with 300 ml of ethyl acetate. The organic phase is washed with a saturated solution of NaHCO$_3$. dried over MgSO$_4$ and evaporated at reduced pressure.

Mass obtained: 8.0 g Yield: 95% amorphous solid

EXAMPLE 3

Synthesis of N-(β-D-glucopyranosyl)-N-tetradecyl-acrylamide: "acrylamidosugar" AC14 a) Synthesis of N-tetradecyl-β-D-glucopyranosylamine

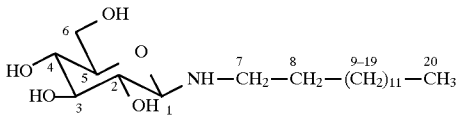

The mixture of a solution of 50 mmol of tetradecylamine (10.65 g) in 25 ml of ethanol and of a solution of 25 mmol (4.5 g) of glucose in 17.5 ml of water is left at ambient temperature for 2 days. The product which crystallizes is filtered off and recrystallized three times from absolute ethanol.

Mass obtained: 5.25 g Yield: 56%

Melting point (° C.)=109° C.

b) Synthesis of N-(β-D-glucopyranosyl)-N-tetradecylacrylamide: "acrylamidosugar" in THF A solution of 85 mmol (9 g) of sodium carbonate in 25 ml of water is added to a solution of 13.7 mmol (4 g) of N-tetradecyl-β-D-glucopyranosylamine in 190 ml of THF. A solution of 26 mmol (2.0 ml) of acryloyl chloride in 20 ml of THF is added dropwise over one hour. The THF is evaporated off and the acylamidosugar is then extracted with 300 ml of ethyl acetate. The organic phase is washed with a saturated solution of $NaHCO_3$, dried over $MgSO_4$ and evaporated at reduced pressure.

Mass obtained: 3.99 g Yield: 89%

Amorphous solid

Melting point (IC) (decomposition)=110° C.

EXAMPLE 4

Preparation of aminated nanoparticles

Composition of the initial microemulsion: water (75%), SDS (8.3%), 1-pentanol (9.2%), styrene (6%), VBC vinyl benzene chloride (1.5%).

Polymerization: ammonium persulfate—tetramethyldiaminomethane initiator, 25° C., 2 hours. The investigation of the suspension using PCS gives a particle size of 25±3 nm (very slightly polydisperse). The elemental analysis of the flocculated polymer is in agreement with an 80% styrene-20% VBC composition: % C 85.24 (found), 87.99 (calc.); % H 7.51 (found), 7.38 (calc.); % Cl 4.34 (found), 4.65 (calc.).

Surface substitution: 1 ml of ethylamine (4.67 eq. relative to the VBC introduced initially) is added to 50 g of suspension of nanoparticles of styrene-VBC copolymer diluted in 280 ml of HEPES buffer (pH=8.5). The suspension is agitated for 48 hours before being dialyzed for 1 hour in order to remove the excess ethylamine (pH checking; duration of the dialysis approximately 1 h). N/Cl elemental analysis of the flocculated polymer enables the degree of substitution to be determined at approximately 50%.

EXAMPLE 5

Grafting of glucoside group onto the nanoparticles in aqueous suspension

The N-(β-D-glucopyranosyl)-N-octylacrylamide (AC8) is added gradually to the suspension of nano-particles at pH buffered at 8.5. The progress of the reaction is determined simply by the disappearance of the reactant in solution: TLC, HPLC. The degree of grafting, expressed relative to the aminomethyl groups present, is 76%.

FUNCTIONALIZATION

1—Functionalization of Estapor® latex particles comprising surface $NH_2$ functional groups

EXAMPLE 6 (CE3a)

Excess of monomer derived from sugar AC8 at ambient temperature

To 10 ml of Estapor® K3-080 latex are added 50 mg of sodium azide $NaN_3$ (bactericide), 50 mg of sodium nitrite $NaNO_2$ (polymerization inhibitor), 100 µl of 10N sodium hydroxide (sodium hydroxide concentration in the reaction mixture: 0.1N) and then 350 mg of acrylamido-sugar AC8 ($10^{-3}$ mol, 5.5 eq./$NH_2$). The reaction mixture is left in the absence of light with gentle stirring (magnetic stirring) for 68 h. The stable suspension obtained is dialyzed to remove the excess of acrylamido-sugar AC8.

The degree of functionalization is determined after flocculation of the polymer.

Flocculation 10 ml of a saturated salt solution (NaCl) and 10 ml of a saturated solution of magnesium sulfate ($MgSO_4$) are added to 5 ml of suspension. The mixture is heated to 80° C. for 1 h to complete the flocculation. The flocculated polymer is recovered by filtration from the hot solution and is then washed abundantly with hot water to remove the excess salts. The polymer thus isolated is dried in the oven at 60° C. to constant weight.

Demonstration of the crafting of sugar in the flocculated polymer:

The presence of grafted sugar in the polymer is demonstrated with the specific "phenol-sulfuric acid" test.

Investigation of the polymer by thin layer chromatography (80/20 dichloromethane/methanol eluent) demonstrates the absence of free acrylamidosugar AC8 monomer (Rf=0.4) and the presence of sugar bound to the polymer (Rf=0).

Elemental analysis: 68.33% C, 6.4% H, 0.85% N.

EXAMPLE 7 (CE3f)

Excess of AC8 monomer with heating

To 10 ml of Estapor® K3-080 latex are added 50 mg of sodium azide $NaN_3$ (bactericide), 50 mg of sodium nitrite $NaNO_2$ (polymerization inhibitor), 100 µl of 10N sodium hydroxide (sodium hydroxide concentration in the reaction mixture: 0.1N) and then 350 mg of acrylamido-sugar AC8 ($10^{-3}$ mol, 5.5 eq./$NH_2$). The reaction mixture is heated to 50° C. with gentle stirring (magnetic stirring) in the absence of light for 3.30 h. The stable suspension obtained is dialyzed to remove the excess acylamidosugar AC8.

The degree of functionalization is determined after flocculation of the polymer.

Flocculation 10 ml of a saturated salt solution (NaCl) and 10 ml of a saturated solution of magnesium sulfate ($MgSO_4$) are added to 5 ml of suspension. The mixture is heated to 80° C. for 1 h to complete the flocculation. The flocculated polymer is recovered by filtration from the hot solution and is then washed abundantly with hot water to remove the excess salts. The polymer thus isolated is dried in the oven at 60° C. to constant weight.

Demonstration of the grafting of sugar in the flocculated polymer

The presence of grafted sugar in the polymer is demonstrated with the specific "phenol-sulfuric acid" test.

Investigation of the polymer by thin layer chromatography (80/20 dichloromethane/methanol eluent) demonstrates the absence of free acrylamidosugar AC8 monomer (Rf=0.4) and the presence of sugar bound to the polymer (Rf=0).

Elemental analysis: 69.15% C, 7.64% H, 1.4% N.

EXAMPLE 8 (CE6a)

Stoichiometric quantity of AC8 monomer at ambient temperature

To 10 ml of Estapor® K3-080 latex are added 50 mg of sodium azide $NaN_3$ (bactericide), 50 mg of sodium nitrite $NaNO_2$ (polymerization inhibitor), 100 µl of 10N sodium hydroxide (sodium hydroxide concentration in the reaction mixture: 0.1N) and then 52 mg of acrylamidosugar AC8 (1.5 $10^{-4}$ mol, 1 eq./$NH_2$). The reaction mixture is left in the absence of light with gentle stirring (magnetic stirring) for 54 h. Following the reaction with thin layer chromatography (80/20 dichloromethane/methanol eluent) demonstrates the complete disappearance of the acrylamidosugar AC8 (Rf=0.4).

The degree of functionalization is determined after flocculation of the polymer.

Flocculation 10 ml of a saturated salt solution (NaCl) and 10 ml of a saturated solution of magnesium sulfate (MgSO$_4$) are added to 5 ml of suspension. The mixture is heated to 80° C. for 1 h to complete the flocculation. The flocculated polymer is recovered by filtration from the hot solution and is then washed abundantly with hot water to remove the excess salts. The polymer thus isolated is dried in the oven at 60° C. to constant weight.

Demonstration of the presence of crafted sugar in the flocculated polymer

The presence of grafted sugar in the polymer is demonstrated with the specific "phenol-sulfuric acid" test.

Investigation of the polymer by thin layer chromatography (80/20 dichloromethane/methanol eluent) demonstrates the absence of free acrylamidosugar AC8 monomer (Rf=0.4) and the presence of sugar bound to the polymer (Rf=0).

Elemental analysis: 89.28% C, 7.56% H, 0.35% N.

EXAMPLE 9 (CD6j)

Stoichiometric quantity of AC8 monomer with heating

To 30 g of Estapor® K3-080 latex are added 150 mg of sodium azide NaN$_3$ (bactericide), 150 mg of sodium nitrite NaNO$_2$ (polymerization inhibitor), 300 yl of 10N sodium hydroxide (sodium hydroxide concentration in the reaction mixture: 0.1N) and then 156 mg of acrylamido-sugar AC8 (4.5 10$^{-4}$ mol, 1 eq./NH$_2$). The reaction mixture is heated to 58° C. with gentle stirring (magnetic stirring) in the absence of light for 3 h. Following the reaction with thin layer chromatography (80/20 dichloromethane/methanol eluent) demonstrates the complete disappearance of the acrylamidosugar AC8 (Rf=0.4).

The degree of functionalization is determined after flocculation of the polymer.

Flocculation 10 ml of a saturated salt solution (NaCl) and 10 ml of a saturated solution of magnesium sulfate (MgSO$_4$) are added to 5 ml of suspension. The mixture is heated to 80° C. for 1 h to complete the flocculation. The flocculated polymer is recovered by filtration from the hot solution and is then washed abundantly with hot water to remove the excess salts. The polymer thus isolated is dried in the oven at 60° C. to constant weight.

Demonstration of the presence of crafted sugar in the flocculated polymer

The presence of grafted sugar in the polymer is demonstrated with the specific "phenol-sulfuric acid" test.

Investigation of the polymer by thin layer chromatography (80/20 dichloromethane/methanol eluent) demonstrates the absence of free acrylamidosugar AC8 monomer (Rf=0.4) and the presence of sugar bound to the polymer (Rf=0).

Elemental analysis: 81.26% C, 7.25% H, 0.36% N.

EXAMPLE 10 (CE61)

Stoichiometric quantity of monomer derived from sugar AC14 with heating

To 30 g of Estapor® K3-080 latex are added 150 mg of sodium azide NaN$_3$ (bactericide), 150 mg of sodium nitrite NaNO$_2$ (polymerization inhibitor), 300 yl of 10N sodium hydroxide (sodium hydroxide concentration in the reaction mixture: 0.1N) and then 193 mg of acrylamido-sugar AC14 (4.5 10$^{-4}$ mol, 1 eq./NH$_2$). The reaction mixture is heated to 58° C. with gentle stirring (magnetic stirring) in the absence of light for 5 h. Following the reaction with thin layer chromatography (80/20 dichloromethane/methanol eluent) demonstrates the complete disappearance of the acrylamidosugar AC14 (Rf=0.4).

The degree of functionalization is determined after flocculation of the polymer.

Flocculation 10 ml of a saturated salt solution (NaCl) and 10 ml of a saturated solution of magnesium sulfate (MgSO$_4$) are added to 5 ml of suspension. The mixture is heated to 80° C. for 1 h to complete the flocculation. The flocculated polymer is recovered by filtration from the hot solution and is then washed abundantly with hot water to remove the excess salts. The polymer thus isolated is dried in the oven at 60° C. to constant weight. Demonstration of the presence of crafted sugar in the flocculated polymer:

The presence of grafted sugar in the polymer is demonstrated with the specific "phenol-sulfuric acid" test.

Investigation of the polymer by thin layer chromatography (80/20 dichloromethane/methanol eluent) demonstrates the absence of free acrylamidosugar AC14 monomer (Rf=0.4) and the presence of sugar bound to the polymer (Rf=0).

Elemental analysis: 80.13% C, 7.26% H, 0.61% N.

EXAMPLE 11 (CE6m)

Stoichiometric quantity of monomer AC8 with heating without added base

To 30 g of Estapor® K3-080 latex are added 150 mg of sodium azide NaN$_3$ (bactericide), 150 mg of sodium nitrite NaNO$_2$ (polymerization inhibitor) and then 156 mg of acrylamidosugar AC8 (4.5 10$^{-4}$ mol, 1 eq./NH$_2$). The reaction mixture is heated to 58° C. with gentle stirring (magnetic stirring) in the absence of light for 5 h. Following the reaction with thin layer chromatography (80/20 dichloromethane/methanol eluent) demonstrates the complete disappearance of the acrylamidosugar AC8 (Rf=0.4).

The degree of functionalization is determined after flocculation of the polymer.

Flocculation 10 ml of a saturated salt solution (NaCl) and 10 ml of a saturated solution of magnesium sulfate (MgSO$_4$) are added to 5 ml of suspension. The mixture is heated to 80° C. for 1 h to complete the flocculation. The flocculated polymer is recovered by filtration from the hot solution and is then washed abundantly with hot water to remove the excess salts. The polymer thus isolated is dried in the oven at 60° C. to constant weight.

Demonstration of the presence of crafted sugar in the flocculated polymer:

The presence of grafted sugar in the polymer is demonstrated with the specific "phenol-sulfuric acid" test.

Investigation of the polymer by thin layer chromatography (80/20 dichloromethane/methanol eluent) demonstrates the absence of free acrylamidosugar AC8 monomer (Rf=0.4) and the presence of sugar bound to the polymer (Rf=0).

Elemental analysis: 90% C, 7.56% H, 0.5% N.

2—Functionalization of particles of modified silica—(CH$_2$)$_4$—NH$_2$

Percentage analysis of the starting silica: % C =3.02, % N=1.03,% Si=41.75%.

EXAMPLE 12 (CLP23)

Addition of the AC8 monomer (640 mg/300 mg) with heating.

To 300 mg of the $NH_2$ modified silica (0.221 meq. $NH_2$) are added 10 ml of a 1N aqueous solution of sodium hydroxide, 50 mg of sodium azide $NaN_3$ (bactericide), 50 mg of sodium nitrite $NaNO_2$ (polymerization inhibitor), and then 640 mg of acrylamidosugar AC8 (1.85 $10^{-3}$ mol). The reaction mixture is heated to 58° C. with gentle stirring (magnetic stirring) in the absence of light for 4 h.

The degree of functionalization is determined after separation of the silica.

Separation of the modified silica

The reaction mixture is neutralized by addition of 1N hydrochloric acid, and then centrifuged. The silica thus isolated is washed abundantly with hot water to remove the excess salts. The modified silica thus isolated is dried in the oven at 60° C. to constant weight.

Demonstration of the presence of grafted sugar

The presence of grafted sugar on the silica is demonstrated with the specific "phenol-sulfuric acid" test.

Investigation of the isolated silica with thin layer chromatography (80/20 dichloromethane/methanol eluent) demonstrates the absence of free acrylamidosugar AC8 monomer (Rf=0.4) and the presence of sugar bound to the polymer (Rf=0).

The IR spectrum demonstrates the presence of sugar.

IR, KBr pellet, $\gamma$ $cm^{-1}$ 1640 (C=O, primary amide); 1200 to 1100 (SiO).

Elemental analysis: 32.93% C, 20.19% Si, 5.67% H, 2.74% N.

EXAMPLE 13 (CLP 25)

Addition of the AC8 monomer (710 mg/100 mg) with heating

To 100 mg of the $NH_2$ modified silica (0.074 meq. $NH_2$) are added 10 ml of a 1N aqueous solution of sodium hydroxide, 50 mg of sodium azide $NaN_3$ (bactericide), 50 mg of sodium nitrite $NaNO_2$ (polymerization inhibitor) and then 710 mg of acrylamido-sugar AC8 (2 $10^{-3}$ mol). The reaction mixture is heated to 58° C. with gentle stirring (magnetic stirring) in the absence of light for 20 h. Following the reaction with thin layer chromatography (80/20 dichloromethane/methanol eluent) demonstrates the complete disappearance of the acrylamidosugar AC8 (Rf=0.4).

The degree of functionalization is determined after separation of the silica.

Separation of the modified silica

The reaction mixture is neutralized by addition of 1N hydrochloric acid, and then centrifuged. The silica thus isolated is washed abundantly with hot water to remove the excess salts. The modified silica thus isolated is dried in the oven at 60° C. to constant weight.

Demonstration of the presence of grafted sugar

The presence of grafted sugar on the silica is demonstrated with the specific "phenol-sulfuric acid" test.

Investigation of the isolated silica with thin layer chromatography (80/20 dichloromethane/methanol eluent) demonstrates the absence of free acrylamidosugar AC8 monomer (Rf=0.4) and the presence of sugar bound to the polymer (Rf=0)

The IR spectrum demonstrates the presence of sugar.

IR, KBr pellet, $\gamma$ $cm^{-1}$ 1640 (C=O, primary amide); 1200 to 1100 (SiO).

Elemental analysis: 35.92% C, 18.23% Si, 6.11% H, 2.95% N.

EXAMPLE 14 (CLP26)

Addition of the AC8 monomer (710 mg/330 mg) with heating

To 330 mg of the $NH_2$ modified silica (0.263 meq. $NH_2$) are added 10 ml of a 1N aqueous solution of sodium hydroxide, 50 mg of sodium azide $NaN_3$ (bactericide), 50 mg of sodium nitrite $NaNO_2$ (polymerization inhibitor) and then 710 mg of acrylamido-sugar AC8 (2 $10^{-3}$ mol). The reaction mixture is heated to 58° C. with mild stirring (magnetic stirring) in the absence of light for 24 h. Following the reaction with thin layer chromatography (80/20 dichloromethane/methanol eluent) demonstrates the complete disappearance of the acrylamidosugar AC8 (Rf=0.4).

The degree of functionalization is determined after separation of the silica.

Separation of the modified silica

The reaction mixture is neutralized by addition of 1N hydrochloric acid, and then centrifuged. The silica thus isolated is washed abundantly with hot water to remove the excess salts. The modified silica thus isolated is dried in the oven at 60° C. to constant weight.

Demonstration of the presence of grafted sugar

The presence of grafted sugar on the silica is demonstrated with the specific "phenol-sulfuric acid" test.

Investigation of the isolated silica with thin layer chromatography (80/20 dichloromethane/methanol eluent) demonstrates the absence of free acrylamidosugar AC8 monomer (Rf=0.4) and the presence of sugar bound to the silica (Rf=0).

The IR spectrum demonstrates the presence of sugar.

IR, KBr pellet, $\gamma$ $cm^{-1}$ 1640 (C=O, primary amide); 1200 to 1100 (SiO)

Elemental analysis: 22.5% C, 18.63% Si, 3.82% H, 4.11% N.

STUDY OF THE STABILITY OF THE MODIFIED LATICES

1—At different pH values

The stability tests were performed on a 2-ml test sample of suspension (CE6j, CE3f and CE61). The pH measurements were performed by means of a pH-meter equipped with a glass electrode. The pH of the suspensions was adjusted by addition of a 0.1N aqueous solution of hydrochloric acid.

The suspensions are stable (visual inspection over a period of time of 3 days) within a pH range varying from 12 to 2. At pH 1 a destabilization is observed after 10 hours.

For comparison, an immediate destabilization of the Estapor® K3-080 starting latex suspension is observed already at pH=3.

2—In the presence of electrolytes

The stability tests were performed on a 2-ml test sample of suspension.

The stability of the suspensions in the presence of different salts in variable concentration was evaluated by visual inspection over a period of time of 3 days.

Tests were carried out on suspensions CE6j, CE3f and CE61.

Sodium chloride NaCl

The suspensions are stable in saturated NaCl solution (20 ml of saturated NaCl aqueous solution/2 ml of suspension).

For comparison, a destabilization of the Estapor® K3-080 starting latex suspension is observed in the same conditions.

Calcium chloride $CaCl_2$

The suspensions CE6j and CE61 obtained in a 0.1N NaOH medium (pH of the suspension # 11) are stable in the presence of $CaCl_2$ up to a concentration of 1 mol $l^{-1}$.

Suspension CE3f is stable in the presence of $CaCl_2$ up to a concentration of $5\times10^{-2}$ mol $l^{-1}$. The same suspension adjusted to pH 3 is stable to the addition of $CaCl_2$ up to a concentration of 1 mol $l^{-1}$.

Magnesium sulfate $MgSO_4$

Suspensions CE6j, CE3f and CE61 are stable in the presence of $MgSO_4$ up to a concentration of 1 mol $l^{-1}$. An irreversible flocculation is observed in the case of $MgSO_4$ concentrations higher than 2 mol $l^{-1}$.

ADSORPTION OF PROTEINS ON THE MODIFIED LATICES

Protocol 1 g of suspension is diluted in an aqueous solution of protein of known concentration. The solution is left undisturbed for 14 hours. The polymer is separated by addition of salts (see above, flocculation of the modified polymers) at ambient temperature, and then centrifuging. The excess protein in the filtrate is determined by the Coomassie Blue calorimetric method.

Results: adsorption of bovine serum albumin BSA.

The adsorbed quantity of BSA is higher than 5 mg per g of suspension (that is to say higher than 70mg of "dry" polymer).

What is claimed is:

1. A particle of latex or of inorganic oxide, in which at least one chain, to the end of which a glycosyl residue is attached, is bound to the surface of said particle, which comprises at the surface amine, thiol and phenol functional radicals and silanol sites in the case of silica particles, at least a proportion of which forms part of the structure of said chain, the latter corresponding to the formula:

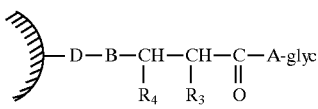

A is the remaining part of said chain,

B is selected from the group consisting of N—$R_1$ radicals, an oxygen atom and a sulfur atom, D is a divalent —$(CH_2)_n$— or phenylene radical, $R_1$ is a $C_1$–$C_4$ alkyl radical or a hydrogen atom, $R_3$ and $R_4$, which are identical or different, denote a $C_1$–$C_6$ lower alkyl radical or a hydrogen atom, n is an integer from 0 to 10, glyc is a glycosyl residue, and

symbolizes the surface of the sphere.

2. The particle as claimed in claim 1, wherein said chain corresponds to the formula:

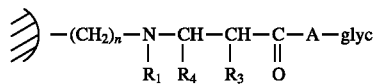

in which:

$R_1$ is a $C_1$–$C_4$ alkyl radical or a hydrogen atom, $R_3$ and $R_4$, which are identical or different, denote a $C_1$–$C_6$ lower alkyl radical or a hydrogen atom, A is the remaining part of said chain, n is an integer from 0 to 10, glyc is a glycosyl residue, and

symbolizes the surface of the sphere.

3. The particle as claimed in claim 1 wherein A is the radical

$R_2$ being a hydrogen atom or a $C_1$–$C_{14}$ alkyl or $C_7$–$C_{14}$ aralkyl radical, said radicals being optionally substituted by one or more terminal or pendent carboxylate or sulfonate radicals.

4. The particle as claimed in claim 1 wherein the proportion of amine, thiol or phenol radicals or modified silanol sites is between 10 and 99%.

5. A silica particle as claimed in claim 1 modified at the surface with amine, thiol or phenol functional radicals or silanol sites, in which a proportion of the functional radicals is joined to a glycosyl residue and in which said chain corresponds to the formula:

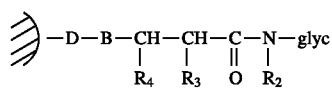

in which

B, D, $R_1$ $R_2$, R, $R_4$, n and glyc have the same meaning as in claim 5.

6. A process for the preparation of a particle as claimed in claim 5, in which an optionally N-alkyl acrylamidoglycosyl is grafted using an addition of the Michael type onto a microsphere of latex or of inorganic oxide functionalized at the surface with primary or secondary amine, thiol or phenol radicals or with silanol sites in the case of the particles of inorganic oxide.

7. The glycosylated latex particle as claimed in claim 1, comprising polymers obtained by polymerization of ethylenically unsaturated monomers, exhibiting amine, thiol or phenol functional radicals at the surface, wherein a proportion of the functional radicals is joined to a glycosyl residue and wherein said chain corresponds to the formula:

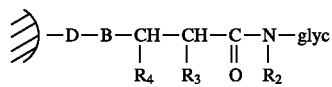

in which

D, B, $R_1$, $R_2$, $R_3$, $R_4$ and glyc have the same meaning as in claim 5.

8. The process for the preparation of a latex particle as claimed in claim 7, in which D is $CH_2$ and B is $N-R_1$, wherein a polystyrene seed and an optionally N-alkyl acrylamidoglycosyl monomer is overpolymerized in the presence of an appropriate quantity of monomer of acrylic type.

9. The particle as claimed in claim 1 wherein n is an integer from 1–10.

10. The particle as claimed in claim 5 having a size of 0.01–20 microns.

11. A particle of latex or of inorganic oxide, which includes from 0.4 to 50 chains, to each end of which a glycosyl residue is attached, bound to the surface of said particle per $nm^2$ of surface area, wherein the chain has a mean length ranging from 5 to 120 angstroms and the chain comprises from 6 to 80 carbon atoms.

* * * * *